No. 869,999. PATENTED NOV. 5, 1907.
M. WASHBURN & R. D. GRANGER.
METER FOR WEIGHING COAL, GRAIN, AND LIKE MATERIAL.
APPLICATION FILED OCT. 13, 1906.
2 SHEETS—SHEET 2.
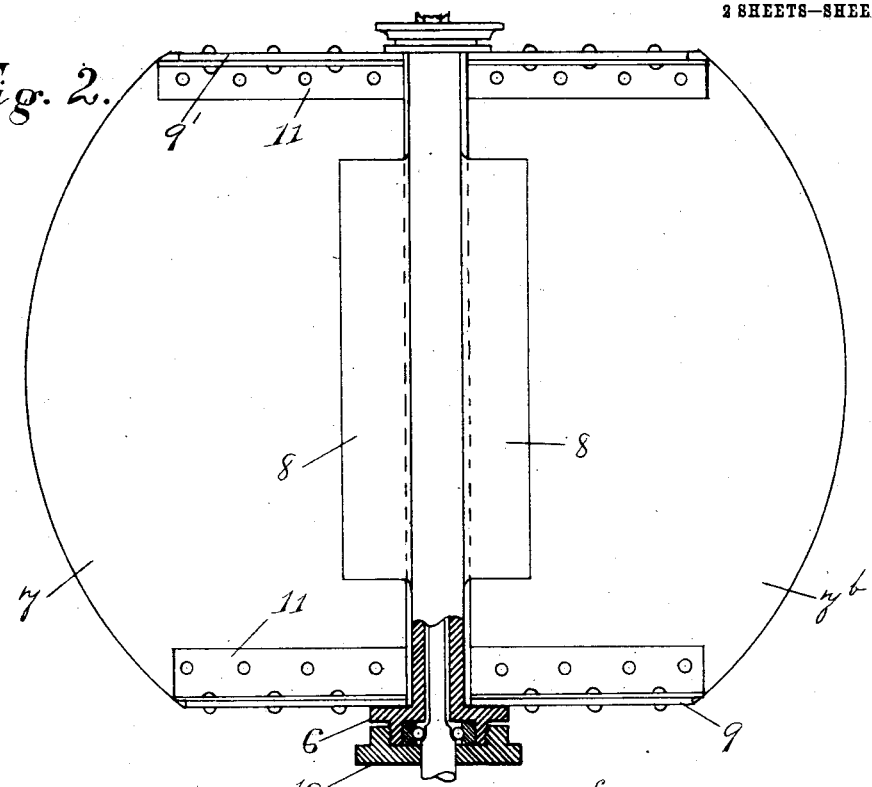
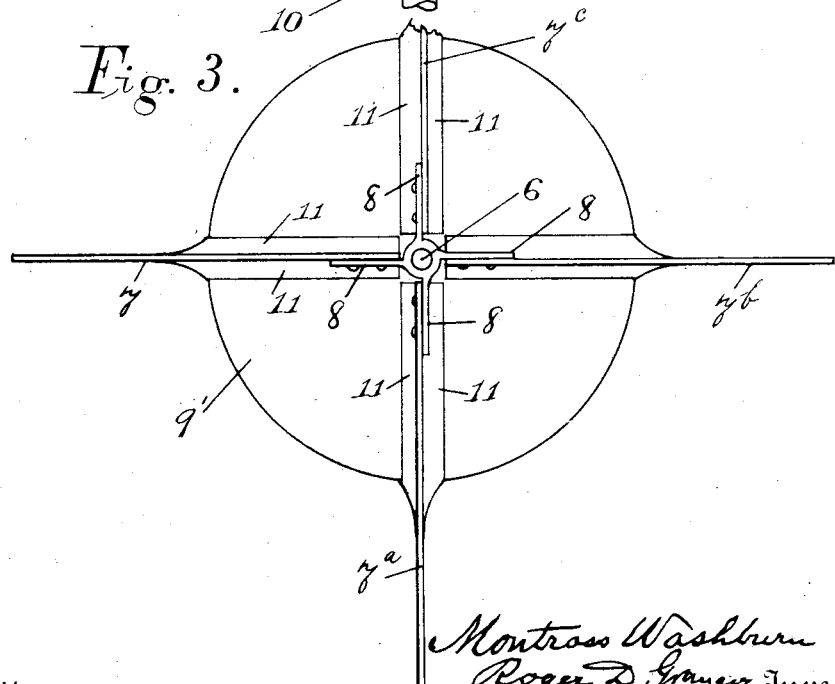

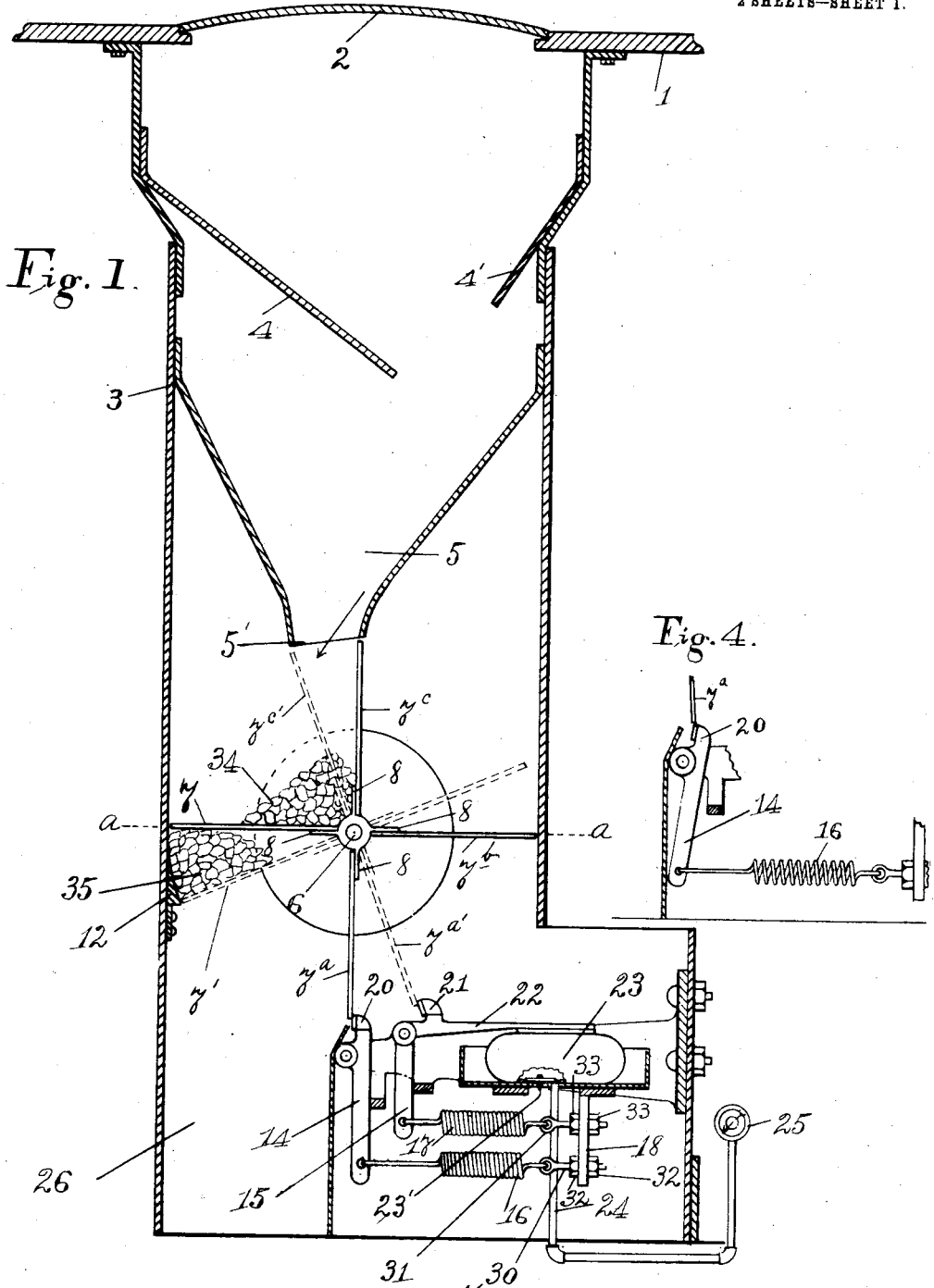

UNITED STATES PATENT OFFICE.

MONTROSS WASHBURN, OF OSSINING, AND ROGER D. GRANGER, OF BROOKLYN, NEW YORK.

METER FOR WEIGHING COAL, GRAIN, AND LIKE MATERIAL.

No. 869,999.                    Specification of Letters Patent.                    Patented Nov. 5, 1907.

Application filed October 13, 1906. Serial No. 338,758.

To all whom it may concern:

Be it known that MONTROSS WASHBURN and ROGER D. GRANGER, citizens of the United States, and residents of Ossining and Brooklyn, respectively, in the counties of Westchester and Kings, respectively, and State of New York, have invented certain new and useful Improvements in Meters for Weighing Coal, Grain, and Like Material, of which the following is a specification.

This invention relates to meters, or devices for weighing coal, grain and other materials, more especially for weighing the same as delivered to the consumer.

The accompanying drawings will serve to illustrate our invention, in which

Figure 1 is a vertical section showing the device as set up for use. Fig. 2 is a transverse horizontal plan on the line a a of Fig. 1. Fig. 3 is an elevation of the revolving bucket or weigher showing an enlarged view of same, with the coal chute removed. Fig. 4 is a detail elevation of one of the spring stops to the rotating compartments of the revolving bucket.

Referring to the drawings, similar reference marks refer to similar parts throughout the several views.

In Fig. 1 at the numeral 1 the surface of the ground is shown, having the scuttle cover or plate 2 which closes the opening to the cellar or coal or grain bin. At 3 is shown the chute, made preferably round, and which has the baffles or partitions 4 and 4′, and the delivering hopper 5 having a contracted outlet at 5′.

The measuring or weighing device consists of a shaft 6 (shown in Figs. 1, 2 and 3) having the compartment partitions 7, 7ª, 7ᵇ, and 7ᶜ attached thereto by means of the flange plates 8. These compartment partitions or vanes 7, 7ª, 7ᵇ, and 7ᶜ are made so that the outer edges conform to the shape of the chute 3 (in the drawing shown to be round), so as to rotate with the shaft 6 in the chute, the whole forming a revolving bucket. On each end of the shaft 6 are fixed the side circular plates or disks 9 and 9′ (see Figs. 2 and 3), to which are attached the rotating compartments at each end. In this way, the circular plates 9 and 9′ form the ends of the rotating compartment, and the parts 7, 7ª, 7ᵇ and 7ᶜ form the bottom of each rotating compartment, respectively; this bottom in each case being firmly secured to the circular plates on ends 9 and 9′ by means of the angle plates 11. The shaft 6 turns on ball bearings at each end—one end of which is shown at 10. At 12 I show a semi-circular projection from one side of the chute 3, so that the rotating compartment on that side (7) may be moved downward from the horizontal position shown in Fig. 1, to the position shown by the dotted line 7′, and still the chute would be closed so that no coal could leave the rotating compartment until it had passed below that position (7′). It will be seen that the load carrier in my weighing device, consists of a revolving bucket divided into compartments by partitions or wings, which successively engage detent levers, said levers being restrained by springs of progressively increasing strength, and yielding under pressure due to the weight of material resting upon the following partition or wing. This novel construction is an important feature of our invention.

In Fig. 1 I show two pivoted levers 14 and 15, provided respectively with the helical springs 16 and 17, one end of each of which is made fast to the fixed wall or frame 18, as shown; and made so as to secure an adjustable tension in the springs 16 and 17 by means of the eye bolts 30 and 31 and the nuts 32 and 33. The upper end of lever 14 has a projecting arm or stop 20, so arranged that the edge of the compartment vane or partition ordinarily strikes the same as it revolves. The spring 16 is of light tension, so that only a small amount of coal in the rotating compartment 7 will operate or extend the spring 16 (as shown in Fig. 4), and allow the preceding rotating compartment 7ª to revolve until it comes in contact with stop 21 on the upper end of the lever 15, as shown by the dotted line 7ª′ in Fig. 1. The spring 17 I make of stronger tension; so that a pressure of considerable amount, say of from 10 lbs. to 50 lbs. weight, or such as desired, on the rotating compartment 7 when at the point 7′ is required to expand the spring 17 so that the preceding bucket 7ª will pass the stop 21.

The lever 15 has a projecting arm 22, the outer end of which presses or rests on the flexible air-tight holder or bag 23. This pneumatic bag or holder has a tube or pipe connection 24, leading to a counter 25, which is of the ordinary type to register the number of times the stop 21 has been operated or the number of times a bucket has revolved past the same. The pneumatic bag 23 is provided with one inlet supply check valve 23′.

In the normal position shown in Fig. 1, the outlet to the hopper at 5′ is so fixed that coal or grain is delivered on or into rotating compartment 7, and directly a certain amount is in the rotating compartment the weight causes the lever 14 to expand the spring 16 (as shown in Fig. 4) and the preceding bucket 7ª leaves the stop 20, and the rotating compartment 7 drops to the position shown by the dotted line 7′. The rotating compartment 7ᶜ has then passed to the position shown by the dotted line 7ᶜ′, and rotating compartment 7ª is resting against the stop 21 in the position shown by the dotted line 7ª′; but the coal or grain in the rotating compartment 7 is near the shaft 6 or center of the revolving rotating compartment (as at 34) before the preceding bucket (7ª) leaves the stop 20; when it leaves the stop 20, and as rotating compartment 7 falls or revolves to the position of 7′, the load in rotating compartment 7 slides outwardly towards the periphery of the rotating compartment, as at 35, increasing the leverage or pressure of rotating compartment 7ª (in the position of 7ª′) on stop 21, so that it overcomes the tension of spring 17, and the bucket revolves, and dumps the load into the bin 26. The movement is helped by the impact of the materials in hopper 5, striking against the successively following rotating compartment (7ᶜ) as it revolves across the outlet (5′) of the hopper—as shown by the arrow in Fig. 1. As the shaft 6 revolves, the successive compartments 7ᶜ, 7ᵇ and 7ª, receive and dump successively a fixed amount of coal, grain or other materials, and the counter 25 records the number of buckets that successively pass the stop 21.

By means of the nuts 32 the tension of spring 16 may be so adjusted that any number of pounds of coal or grain desired, will, when on the horizontal rotating compartment near the center, as at 34, press back the stop 20 and allow the preceding rotating compartment to pass to stop 21; and by means of the nuts 33, the tension of spring 17 may be so adjusted that when the load at 34 slides outwardly to the periphery as at 35, the increased pressure or leverage will (by aid of the impact of the materials on the following rotating compartment, from the mouth 5′) be just sufficient to overcome such tension and allow the preceding rotating compartment to pass stop 21.

Having thus described our invention, what we claim as new and original and desire to secure by Letters Patent is—

1. In an automatic weighing device the combination of a revolving bucket, with two pivoted levers, each having a stop at one end and a spring attached thereto at the other end; said springs being of progressively increasing tension as said stops are sequentially engaged successively by the wings of said bucket—whereby said bucket is prevented from revolving successively by said stops until the pressure thereon is sufficient to overcome successively the tension of said springs.

2. In an automatic weighing device the combination of a revolving bucket consisting of a plurality of revolving compartment partitions on a shaft; with two pivoted levers, each having a stop at one end and a spring attached thereto at the other end; said springs being of progressively increasing tension as said stops are sequentially engaged by said revolving compartment partitions—whereby said partitions are successively prevented from revolving by said stops until the pressure thereon is sufficient to overcome successively the tension of said springs.

3. In an automatic weighing device, the combination of a chute; a shaft therein provided with a series of wings forming compartments, the whole forming a revolving bucket; two spring-actuated pivoted levers each having a stop; and a semi-circular wall projecting inwardly from said chute—the parts being so arranged that the weight of the load of material to be weighed actuates one lever and stop, and the sliding of the load in the bucket to the periphery thereof against the inwardly projecting wall of said chute actuates the other lever and stop.

4. In an automatic weighing device, the combination of a chute; a shaft therein provided with a series of wings forming compartments, the whole forming a revolving bucket; two spring-actuated pivoted levers, each having a stop; and a semi-circular wall projecting inwardly from said chute—the parts being so arranged that the weight of the load of material to be weighed actuates one lever and stop, and the sliding of the load in the bucket to the periphery thereof against the inwardly projecting wall of said chute actuates the other lever and stop, both levers and stops being actuated by the successively preceding revolving wing.

Signed at New York city in the county of New York and State of New York this 8th day of October A. D. 1906.

MONTROSS WASHBURN.
ROGER D. GRANGER.

Witnesses:
CLARENCE PLACE,
J. G. GADSDEN.